(12) United States Patent
Kii (10) Patent No.: US 8,595,518 B2
(45) Date of Patent: Nov. 26, 2013

(54) SEMICONDUCTOR INTEGRATED CIRCUIT AND ELECTRONIC INFORMATION DEVICE

(75) Inventor: Yasuyuki Kii, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 357 days.

(21) Appl. No.: 13/046,826

(22) Filed: Mar. 14, 2011

(65) Prior Publication Data
US 2011/0254597 A1    Oct. 20, 2011

(30) Foreign Application Priority Data
Mar. 15, 2010   (JP) ................................. 2010-058480

(51) Int. Cl.
*G06F 1/32*   (2006.01)

(52) U.S. Cl.
USPC ............................ 713/300; 713/310; 713/320

(58) Field of Classification Search
USPC ......................................... 713/300, 310, 320
See application file for complete search history.

(56) References Cited

U.S. PATENT DOCUMENTS

| | | | | |
|---|---|---|---|---|
| 7,577,858 | B2 * | 8/2009 | Garg et al. ..................... | 713/320 |
| 8,327,173 | B2 * | 12/2012 | Hendin et al. ................. | 713/323 |
| 8,412,967 | B2 * | 4/2013 | De Martini et al. ........... | 713/320 |
| 2003/0204713 | A1 * | 10/2003 | Hales et al. ........................ | 713/1 |
| 2004/0221187 | A1 * | 11/2004 | Durand et al. ................. | 713/300 |
| 2004/0245979 | A1 * | 12/2004 | Ikoma et al. ................... | 323/364 |
| 2006/0075267 | A1 * | 4/2006 | Tokue ............................ | 713/300 |
| 2008/0086650 | A1 * | 4/2008 | Ozawa ........................... | 713/310 |
| 2009/0144571 | A1 * | 6/2009 | Tatsumi ......................... | 713/320 |

FOREIGN PATENT DOCUMENTS

| | | | |
|---|---|---|---|
| JP | 63-65714 A | 3/1988 | |
| JP | 8-87364 A | 4/1996 | |
| JP | 8-274620 A | 10/1996 | |
| JP | 2002-132397 A | 5/2002 | |
| JP | 2003-330581 A | 11/2003 | |
| JP | 2006-209186 A | 8/2006 | |
| JP | 2006-350483 A | 12/2006 | |
| JP | 2007-304909 A | 11/2007 | |

\* cited by examiner

*Primary Examiner* — Kim Huynh
*Assistant Examiner* — Zahid Choudhury
(74) *Attorney, Agent, or Firm* — Birch, Stewart, Kolasch & Birch, LLP (57) ABSTRACT

The semiconductor integrated circuit according to the present invention includes a mode switching circuit for switching an operation mode of a main core circuit among a plurality of internal circuits between a normal operation mode and a stand-by mode; and a stand-by canceling circuit for instructing the mode switching circuit to cancel a stand-by mode, and the mode switching circuit and the stand-by canceling circuit are configured to operate in asynchronism with the system clock with stand-by voltage in the stand-by mode. Thus, the semiconductor integrated circuit is capable of achieving operations with reduced power consumption with restrained leakage current by further reducing power source voltage during a stand-by mode, while maintaining advantages of shortening a time required to return from the stand-by mode, and of requiring no additional circuitry, such as non-volatile memory, for returning from the stand-by mode and thus requiring no extra cost.

10 Claims, 8 Drawing Sheets

SEMICONDUCTOR INTEGRATED CIRCUIT AND ELECTRONIC INFORMATION DEVICE

This nonprovisional application claims priority under 35 U.S.C. §119 (a) to Patent Application No. 2010-058480 filed in Japan on Mar. 15, 2010, the entire contents of which are hereby incorporated by reference.

BACKGROUND OF THE INVENTION

1. Field of the Invention

The present invention is directed to a semiconductor integrated circuit and an electronic information device. More particularly, the present invention is directed to a semiconductor integrated circuit, such as an embedded IC, required to operate under a low power consumption, and an electronic information device equipped with the semiconductor integrated circuit.

2. Description of the Related Art

The reduction of power consumption in a semiconductor integrated circuit has long been a major objective. One of the ways to achieve it is a method of providing two modes, such as a normal operation mode and a stand-by mode, in a semiconductor integrated circuit in order to reduce power consumption in the circuit by shutting down a system clock during a period when the semiconductor integrated circuit can shut down its functions, such as when there are no key inputs for a while at a PDA (Personal Digital Assistance) terminal.

Figure 8:
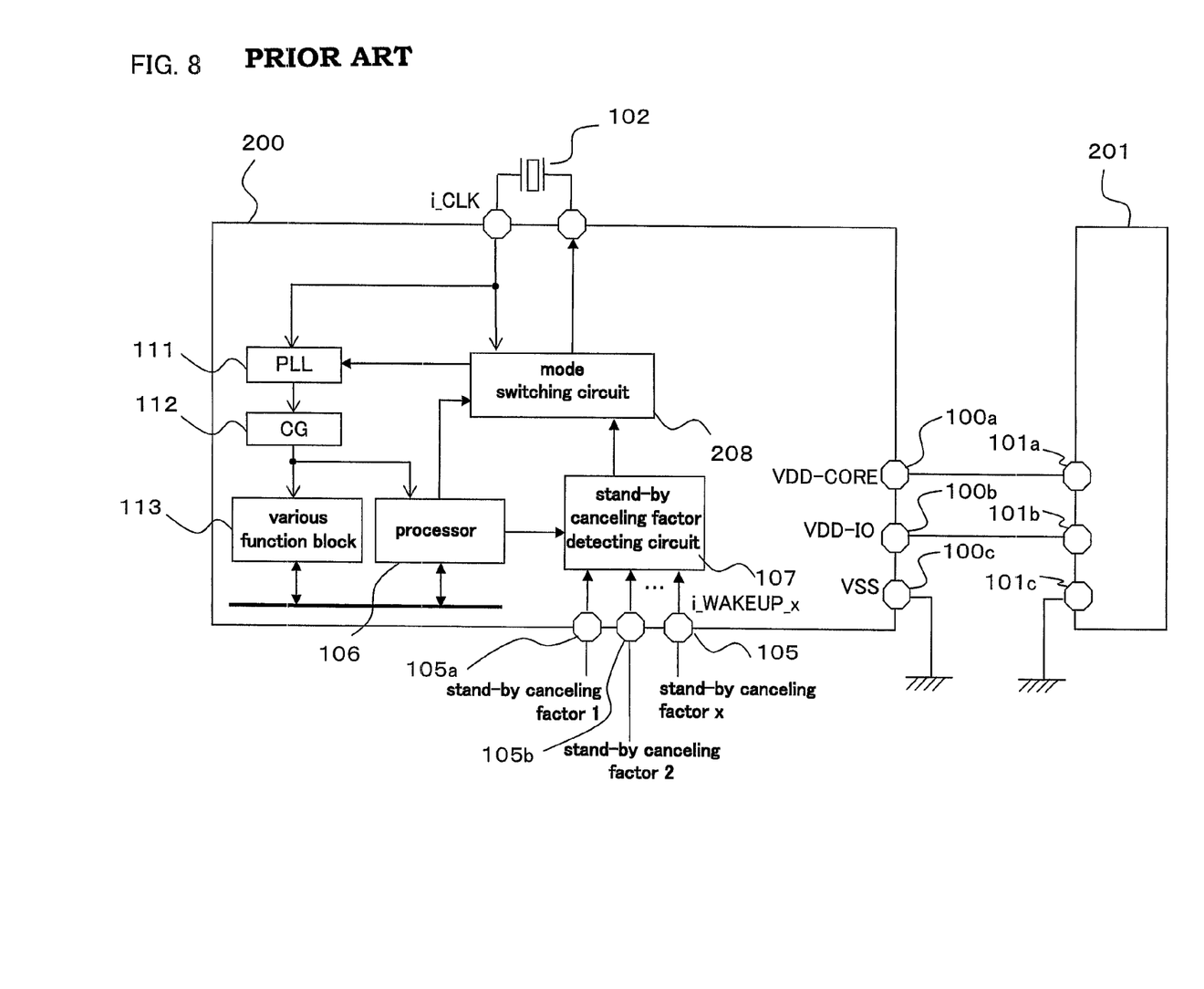
FIG. 8 is a block diagram describing a conventional semiconductor integrated circuit 200.

FIG. 8 is a diagram describing such a conventional semiconductor integrated circuit.

A semiconductor integrated circuit 200 operates with an operating voltage from a power supply circuit 201. The semiconductor integrated circuit 200 includes: a core power source terminal (VDD-CORE) 100a; an IO power source terminal (VDD-IO) 100b; and a grounded power source terminal (VSS) 100c. VDD-CORE voltage and VDD-IO voltage are supplied to the core power source terminal 100a and the IO power source terminal 100b, from corresponding terminals 101a and 101b of the power supply circuit 201.

The grounded power source terminal 100c of the semiconductor integrated circuit 200 and a grounded power source terminal 101c of the power supply circuit 201 are set with a grounding electric potential.

The semiconductor integrated circuit 200 includes: a function block 113, which is an internal circuit thereof, for executing various functions; and a processor 106 for controlling the operation of the function block 113. The function block 113 and the processor 106 are connected to each other through a bus. The semiconductor integrated circuit 200 also includes: a clock generator (CG) 112 for generating a system clock for operating the function block 113 and the processor 106; and a phase locked loop circuit (PLL circuit) 111 for determining a frequency of the system clock generated by the clock generator 112. The PLL circuit 111 is connected with a crystal oscillator 102 for generating a clock signal (i_CLK) to be supplied to the PLL circuit 111.

The semiconductor integrated circuit 200 also includes: stand-by canceling factor input terminals 105a, 105b ... 105, into which wake-up signals (i_WAKEUP_1, i_WAKEUP_2, ... i_WAKEUP_x) are inputted in accordance with a plurality of stand-by canceling factors 1, 2 ... x; a stand-by canceling factor detecting circuit 107 for outputting a stand-by canceling signal based on the wakeup signals inputted in the terminals; and a mode switching circuit 208 for shutting down the PLL circuit 111 and the oscillator 102 based on the stand-by signals from the processor 106, and for canceling the shutdown state of the PLL circuit 111 and the oscillator 102, by the stand-by canceling signal from the stand-by canceling factor detecting circuit 107, to resume the operation.

The internal circuits constituting the semiconductor integrated circuit 200, that is to say, the various function block 113, processor 106, clock generator 112, PLL circuit 111, stand-by canceling factor detecting circuit 107 and mode switching circuit 208, are configured to operate with the VDD-CORE voltage. The semiconductor integrated circuit 200 also includes a circuit driven with the VDD-IO voltage, such as a drive circuit (not shown) which constitutes input and output terminals. Herein, the VDD-CORE voltage is 1.2V±0.1V, and the VDD-IO voltage is 1.8V±0.1V.

In the semiconductor integrated circuit 200 with the configuration described above, when the internal processor 106, for example, detects that there is no key input for a certain period of time, the processor 106 instructs the mode switching circuit 208 to switch its mode from a normal operation mode to a stand-by mode, using a mode switching signal. When the mode switching circuit 208 receives the mode switching signal from the processor 106, the mode switching circuit 208 shuts down the crystal oscillator 102 and the PLL circuit 111 to switch the operation mode from the normal operation mode to the stand-by mode.

On the other hand, the returning to the normal operation mode from the stand-by mode is performed by the semiconductor integrated circuit 200 itself upon detecting a key input. Herein, the stand-by canceling factor detecting circuit 107 in the semiconductor integrated circuit 200 detects the generation of a key input as one of the stand-by canceling factors, and instructs the mode switching circuit 208 to return to the normal operation mode from the stand-by mode using the stand-by canceling signal. Upon receiving the stand-by canceling signal, the mode switching circuit 208 allows the crystal oscillator 102 and the PLL circuit 111 to resume their operation. As a result, the operation mode of the semiconductor integrated circuit 200 is returned to the normal operation mode.

The reduction of power consumption in the semiconductor integrated circuit 200 has been conventionally achieved by the switching between the normal operation mode and the stand-by mode. In recent years, however, the miniaturizing of semiconductor integrated circuits has been advanced, and as a result, leakage current of the amount that is not negligible flows even when the system clock is shut down. Thus, a new problem of not being able to achieve as much reduction of power consumption as before has occurred even if the operation mode is switched to the stand-by mode.

As a method for coping with the problem, conceived are a method for restraining leakage current itself by turning off the power source of part of internal circuits in a semiconductor integrated circuit (Reference 1), and a method for restraining leakage current by supplying a voltage that is a little lower than a normal operating voltage during stand-by (Reference 2).

Reference 1: Japanese Laid-Open Publication No. 2002-132397

Reference 2: Japanese Laid-Open Publication No. 63-65714

SUMMARY OF THE INVENTION

With the conventional configuration described above, the former method, that is, the method for turning off a power source of part of internal circuits in a semiconductor integrated circuit, as disclosed in Reference 1, is expected to be very effective for reducing power consumption. The method, however, turns off the power source, resulting in not being able to retain the state of the semiconductor integrated circuit. This causes it to be necessary to redo the circuit setting upon returning from the stand-by mode, or to save the internal state in a non-volatile memory prepared in advance either in the inside or outside of the semiconductor integrated circuit, and restore the saved state upon returning from the stand-by mode. Owing to this, there is a problem of taking a long time for the returning from the stand-by mode, or costing more for preparing a non-volatile memory additionally.

On the other hand, the latter method, that is, the method for restraining leak current by supplying a voltage that is a little lower than a normal operating voltage during stand-by allows the state of the semiconductor integrated circuit to be retained during the stand-by mode since power is supplied constantly. Thus, the method is advantageous such that only a short period of time is required for the returning from the stand-by mode, and there is no need of an excess non-volatile memory. However, the latter method is disadvantageous of not achieving as much effectiveness of reducing power consumption as the former method.

In particular, in the method disclosed in Reference 2, the shutdown of oscillation is simultaneously canceled and oscillation is resumed upon the returning from the stand-by mode. Thus, the voltage can be reduced during the stand-by mode only to the voltage allowing an oscillation circuit to be operable. For such a reason, and due to the increase in the leakage current particularly in recent years, a significant problem has arisen where leakage current is not reduced so much even if operating voltage is reduced to some extent and the operation mode is switched from the normal operation mode to the stand-by mode.

The present invention is intended to solve the conventional problems described above. The objective of the present invention is to provide a semiconductor integrated circuit and an electronic information device equipped with the semiconductor integrated circuit, the semiconductor integrated circuit being capable of achieving operations with reduced power consumption with restrained leakage current by further reducing power source voltage during a stand-by mode, while maintaining advantages of shortening a time required to return from the stand-by mode, and of requiring no additional circuitry, such as non-volatile memory, for returning from the stand-by mode and thus requiring no extra cost.

A semiconductor integrated circuit according to the present invention includes a plurality of internal circuits, and has a normal operation mode, in which a major core circuit among the plurality of internal circuits performs an operation based on a system clock, and a stand-by mode, in which an operating voltage of the core circuit is decreased to a stand-by voltage that is lower than the operating voltage in the normal operation mode, the semiconductor integrated circuit further including: a mode switching circuit for switching an operation mode of the core circuit between the normal operation mode and the stand-by mode; and a stand-by canceling circuit for instructing the mode switching circuit to cancel the stand-by mode, where: the mode switching circuit and the stand-by canceling circuit are configured to operate in asynchronism with the system clock with the stand-by voltage; and in the stand-by mode, the operating voltage of the core circuit is decreased to the stand-by voltage which is less than the limit of the operation based on the system clock, thereby achieving the objective described above.

Preferably, in a semiconductor integrated circuit according to the present invention, the semiconductor integrated circuit further includes a mode switching information output terminal section for outputting, to an external power supply circuit, a mode switching signal for instructing mode switching outputted from the mode switching circuit, the mode switching information output terminal section including a transistor operable with the stand-by voltage and with a low threshold voltage.

Still preferably, in a semiconductor integrated circuit according to the present invention, the mode switching information output terminal section is connected with the power supply circuit for supplying the operating voltage to the plurality of internal circuits; and the power supply circuit supplies a core voltage in accordance with the operation mode, as the operating voltage, to the core circuit, and supplies an operating voltage of a constant electric potential, regardless of the operation mode, to the internal circuits other than the core circuit among the plurality of internal circuits.

Still preferably, in a semiconductor integrated circuit according to the present invention, the power supply circuit includes a terminal for inputting a voltage stabilizing signal, which is outputted when the core voltage is raised from the stand-by voltage to the operating voltage in the normal operation mode, after the power supply circuit receives an instruction to cancel the stand-by mode from the mode switching information output terminal section.

Still preferably, in a semiconductor integrated circuit according to the present invention, the semiconductor integrated circuit further includes an oscillation shutdown cancel circuit for controlling a oscillation shutdown and shutdown cancel of an oscillator for generating a clock signal to be a reference of the system clock, the oscillation shutdown cancel circuit controlling the oscillator such that oscillation by the oscillator is shut down based on the mode switching signal from the mode switching circuit, and controlling the oscillator such that the oscillation by the oscillator is resumed based on the voltage stabilizing signal from the power supply circuit.

Still preferably, in a semiconductor integrated circuit according to the present invention, the plurality of internal circuits include a memory circuit for storing various data as the core circuit; and the stand-by voltage is a voltage which is more than a limit for retaining a storing state of the data in the memory circuit.

Still preferably, in a semiconductor integrated circuit according to the present invention, the stand-by canceling circuit instructs the mode switching circuit to cancel the stand-by mode in accordance with a predetermined stand-by canceling factor among a plurality of stand-by canceling factors.

Still preferably, in a semiconductor integrated circuit according to the present invention, the stand-by canceling circuit includes a selection register with a plurality of setting regions for setting a value to each of the plurality of stand-by canceling factors, in accordance with whether each of the plurality of stand-by canceling factors is determined to be valid or invalid; and by the value set in the setting regions of the selection register, a predetermined stand-by canceling factor is masked among the plurality of stand-by canceling factors in order not to cancel the stand-by mode by the redetermined stand-by canceling factor.

Still preferably, in a semiconductor integrated circuit according to the present invention, the semiconductor integrated circuit further includes a processor for controlling the core circuit, where the mode switching circuit switches the operation mode of the core circuit, from the normal operation mode to the stand-by mode, based on an instruction signal from the processor.

An electronic information device according to the present invention includes the semiconductor integrated circuit according to the present invention, thereby achieving the objective described above.

The functions of the present invention will be described hereinafter.

The present invention includes the mode switching circuit for switching an operation mode of the main core circuit among a plurality of internal circuits between a normal operation mode and a stand-by mode; and the stand-by canceling circuit for instructing the mode switching circuit to cancel the stand-by mode, and the mode switching circuit and the stand-by canceling circuit are configured to operate in asynchronism with the system clock with a stand-by voltage in the stand-by mode. As a result, in the stand-by mode, even when the operating voltage of the core circuit is reduced to a stand-by voltage, which is less than an operational limit based on the system clock, the mode switching circuit and the stand-by canceling circuit are operable in the stand-by mode without depending on the system clock, and the operation mode can be returned from the stand-by mode to the normal operation mode.

That is, in the stand-by mode, the power source voltage can be decreased to less than the operational limit of the core circuit based on the system clock, thereby further restraining leakage current. Furthermore, even when the power source voltage is decreased to less than the operational limit of the core circuit based on the system clock, the power source voltage is retained to be higher than a voltage for which data is retained in a memory circuit or the like. Thereby, the state of the semiconductor integrated circuit can be retained, and it is thus not necessary to redo the circuit setting after the returning to the stand-by mode, or to store the internal state in a non-volatile memory prepared in advance on the inside or outside of the semiconductor integrated circuit.

As a result, leak current can be restrained by further reducing the power source voltage in the stand-by mode while maintaining advantages of shortening a time required to return from the stand-by mode, and of requiring no additional circuitry, such as non-volatile memory, for returning from the stand-by mode and thus requiring no extra cost.

Furthermore, according to the present invention, a mode-switching information outputting terminal section externally outputs a mode switching signal, which is outputted from the mode switching circuit, and the mode switching information output terminal section is configured to include a transistor operable with a stand-by voltage and with a low threshold voltage, so that it is possible to inform an external power supply circuit or the like of the returning from the stand-by mode to the normal mode.

According to the present invention, the power supply circuit supplies core voltage as an operating voltage in accordance with an operation mode to the core circuit among the plurality of internal circuits in the semiconductor integrated circuit, while supplying operating voltage of a constant electric potential regardless of the operation mode to the other internal circuits than the core circuit among the plurality of internal circuits. Thereby, the internal circuits with little current leak, other than the core circuit, can maintain the normal operating voltage even during the stand-by mode.

According to the present invention, the power supply circuit outputs a voltage stabilizing signal after receiving an instruction to cancel a stand-by mode from the mode-switching information outputting terminal section and when raising the core voltage from the stand-by voltage to an operating voltage in the normal operation mode. Thus, upon receiving the voltage stabilizing signal from the power supply circuit, the semiconductor integrated circuit resumes the generation of the system clock, thereby stably returning from the stand-by mode to the normal operation mode without causing a malfunction or the like.

According to the present invention, the stand-by canceling circuit instructs the mode switching circuit to cancel a stand-by mode in accordance with a predetermined stand-by canceling factor among a plurality of stand-by canceling factors. Thereby, a predetermined stand-by canceling factor can be masked in accordance with the use or operation state of the semiconductor integrated circuit.

For example, the following operation is possible. When a mobile device such as a mobile phone is folded for the closed state by closing a lid thereof to switch over to a stand-by mode, the mode can be set to return from the stand-by mode to a normal mode when the lid is opened, and the mode will not be switched from the stand-by mode to the normal mode even if an operation button is pressed during which the lid is closed.

According to the present invention, the mode switching circuit switches the operation mode of the core circuit from a normal operation mode to a stand-by mode based on an instruction signal from the processor for controlling the core circuit, thereby avoiding to switch over to the stand-by mode while the core circuit is being in operation under the controlling by the processor. As a result, it becomes possible to avoid hang-up and malfunction of the semiconductor integrated circuit.

According to the present invention, the present invention includes the mode switching circuit for switching an operation mode of the main core circuit among a plurality of internal circuits between a normal operation mode and a stand-by mode; and the stand-by canceling circuit for instructing the mode switching circuit to cancel the stand-by mode, and the mode switching circuit and the stand-by canceling circuit are configured to operate in asynchronism with the system clock with stand-by voltage in the stand-by mode. As a result, it is possible to obtain a semiconductor integrated circuit and an electronic information device equipped with the semiconductor integrated circuit, the semiconductor integrated circuit being capable of achieving operations with reduced power consumption with restrained leakage current by further reducing power source voltage during a stand-by mode, while maintaining advantages of shortening a time required to return from the stand-by mode, and of requiring no additional circuitry, such as non-volatile memory, for returning from the stand-by mode and thus requiring no extra cost.

These and other advantages of the present invention will become apparent to those skilled in the art upon reading and understanding the following detailed description with reference to the accompanying figures.

BRIEF DESCRIPTION OF THE DRAWINGS

FIG. 7(a) illustrates a circuit constituting the terminal, and FIGS. 7(b) and 7(c) each illustrate a specific transistor circuit in the circuit constituting the terminal.

100, 200 semiconductor integrated circuit
101, 201 power supply circuit
102 crystal oscillator
103 mode-switching information outputting terminal
104 power source stabilizing information inputting terminal
105a, 105b, 105 stand-by canceling factor input terminal
106 processor
107 stand-by canceling factor detecting circuit
108, 208 mode switching circuit
109 oscillation shutdown/cancel circuit
110 PLL shutdown/cancel circuit
111 PLL circuit
112 clock generator (CG)
113 various function block
100a to 100c, 114, 115, 101a to 101c terminal
300 stand-by canceling factor selecting register
301a, 301b, 301 stand-by canceling factor selecting circuit (AND gate)
302a, 302b, 302 stand-by canceling factor selecting circuit (FF circuit with an asynchronous set)
303 stand-by canceling factor generating circuit (NOR gate)
400 stand-by mode switch-over register
401 stand-by mode switching signal controlling circuit (FF with an asynchronous reset/set)
500 oscillation shutdown signal generating circuit (FF with an asynchronous reset/set)
501 oscillation shutdown signal generating circuit (AND gate)
502 oscillation shutdown circuit (NAND gate)
600 PLL cancel time measuring circuit (counter)
601 PLL enable signal generating circuit (AND gate)

DESCRIPTION OF THE PREFERRED EMBODIMENTS

Hereinafter, an embodiment of the present invention will be described with reference to the accompanying figures.

(Embodiment 1)

Figure 1:
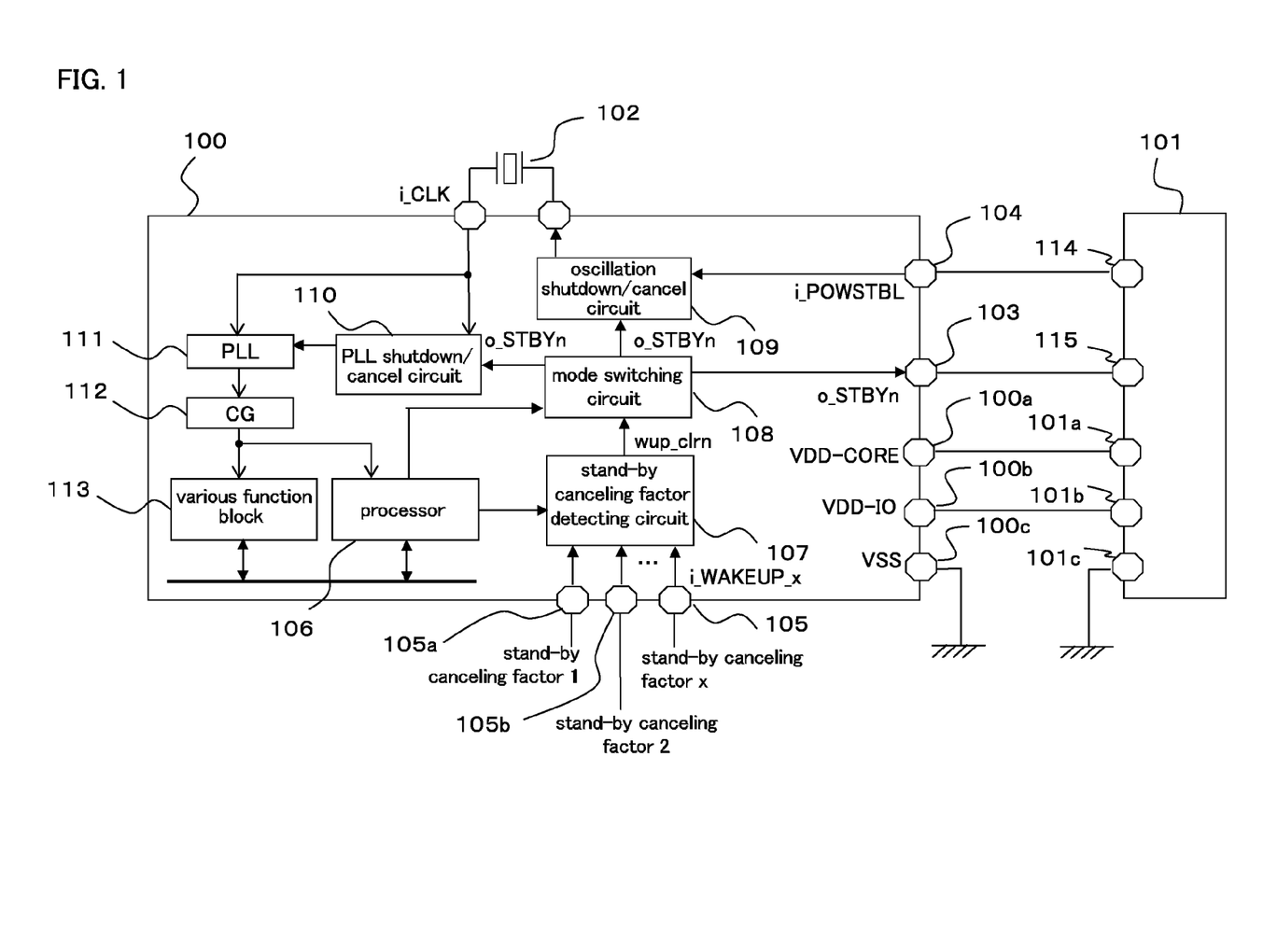
FIG. 1 is a block diagram illustrating a semiconductor integrated circuit 100 according to Embodiment 1 of the present invention.

FIG. 1 is a diagram describing a configuration of a semiconductor integrated circuit according to Embodiment 1 of the present invention.

A semiconductor integrated circuit 100 according to Embodiment 1 includes: a mode-switching information outputting terminal 103; a power source stabilizing information inputting terminal 104; stand-by canceling factor inputting terminals 105a, 105b and 105; a processor 106; a stand-by canceling factor detecting circuit 107; a mode switching circuit 108; an oscillation shutdown/cancel circuit 109; a PLL shutdown/cancel circuit 110; a PLL circuit 111; a CG (clock generator) circuit 112; a various function block 113, a bus for connecting the processor and the various function block, and the like.

That is, the semiconductor integrated circuit 100 according to Embodiment 1 includes, being different from and instead of the mode switching circuit 208 in the conventional semiconductor integrated circuit 200 illustrated in FIG. 8: a mode switching circuit 108; an oscillation shutdown/cancel circuit 109; and a PLL shutdown/cancel circuit 110, and the semiconductor integrated circuit 100 further includes a terminal (mode-switching information outputting terminal) 103 for informing an external power supply circuit 101 of a mode switching instruction from the mode switching circuit 108; and a terminal (power source stabilizing information inputting terminal) 104 for receiving information informing that a power supply voltage is stabilized, from the external power supply circuit 101.

The power supply circuit 101 for supplying power to the semiconductor integrated circuit 100 according to Embodiment 1 has a different configuration from that of the power supply circuit 201 for supplying power to the conventional semiconductor integrated circuit 200 illustrated in FIG. 8. Further, in addition to the terminals 101a to 101c of the semiconductor integrated circuit 200, the power supply circuit 101 includes: a terminal 115 for receiving a signal from the mode-switching information outputting terminal 103 of the semiconductor integrated circuit 100; and a terminal 114 for outputting a signal for informing the power source stabilizing information inputting terminal 104 of the semiconductor integrated circuit 100 that the voltage has been stabilized.

From the power supply circuit 101 to the semiconductor integrated circuit 100, a power supply voltage, VDD-IO (e.g., 1.8V±0.1V), and a core voltage, VDD-CORE (e.g., 1.2V±0.1V at a normal operation mode), are stably supplied. The power supply voltage, VDD-IO, is for terminal portions (including a drive circuit, a protection circuit and the like) other than the core circuits 106 to 113 among the plurality of internal circuits in the semiconductor integrated circuit 100. The core voltage, VDD-CORE, is for operating the core portion (core circuit). During the normal operation mode, the semiconductor integrated circuit 100 operates in synchronism with a system clock outputted from the CG circuit 112. In addition, the power supply circuit 101 is configured to decrease the core voltage (that is, operating voltage of the core circuit), VDD-CORE, from a voltage in the normal operation mode (1.2V±0.1V) to a stand-by voltage (e.g., 0.8V±0.1V), which is less than the limit of the core circuit operation based on the system clock, when received a mode switching instruction from the semiconductor integrated circuit 100.

In the semiconductor integrated circuit 100 according to Embodiment 1, upon receiving an instruction to switch over to the stand-by mode from the processor 106, the mode switching circuit 108 is configured to instruct the external power supply circuit 101 to decrease the core voltage, using a mode switching signal (o_STBYn), and to instruct the PLL shutdown/cancel circuit 110 and the oscillation shutdown/cancel circuit 109 to shutdown the PLL circuit 111 and the crystal oscillator 102. Upon receiving a stand-by canceling instruction from the stand-by canceling factor detecting circuit 107, the mode switching circuit 108 is configured to instruct the external power supply circuit 101 to restore the core voltage, using a mode switching signal (o_STBYn).

Further, in Embodiment 1, the external power supply circuit 101 is configured to output a voltage stabilization signal (i_POWSTBL) when an operation of restoring the core voltage, from the voltage during the stand-by mode to the voltage during the normal operation mode, in response to the mode switching signal for instructing to cancel the stand-by mode from the mode switching circuit 108, is completed and the voltage is stabilized. Upon receiving the voltage stabilization signal, the oscillation shutdown/cancel circuit 109 is configured to start the oscillation of the crystal oscillator 102. By the resumption of the oscillation in the crystal oscillator 102, the PLL shutdown/cancel circuit 110 and the PLL circuit 111 are to start their operation.

Hereinafter, specific configurations will be described with regard to the stand-by canceling factor detecting circuit 107, mode switching circuit 108, oscillation shutdown/cancel circuit 109 and PLL shutdown/cancel circuit 110, which constitute the semiconductor integrated circuit 100 according to Embodiment 1.

FIGS. 3 to 6 each illustrate a specific circuit configuration of the stand-by canceling factor detecting circuit 107, mode switching circuit 108, oscillation shutdown/cancel circuit 109 and PLL shutdown/cancel circuit 110. Note that FIGS. 3 to 6 illustrate some of FF (flip flop) circuits with an asynchronous reset/set, and the FF circuits are assumed as those in which an asynchronous reset works with priority when both an asynchronous reset and an asynchronous set are asserted therein (that is, the output of the FF circuit is always "0" when the asynchronous reset is asserted).

Figure 3:
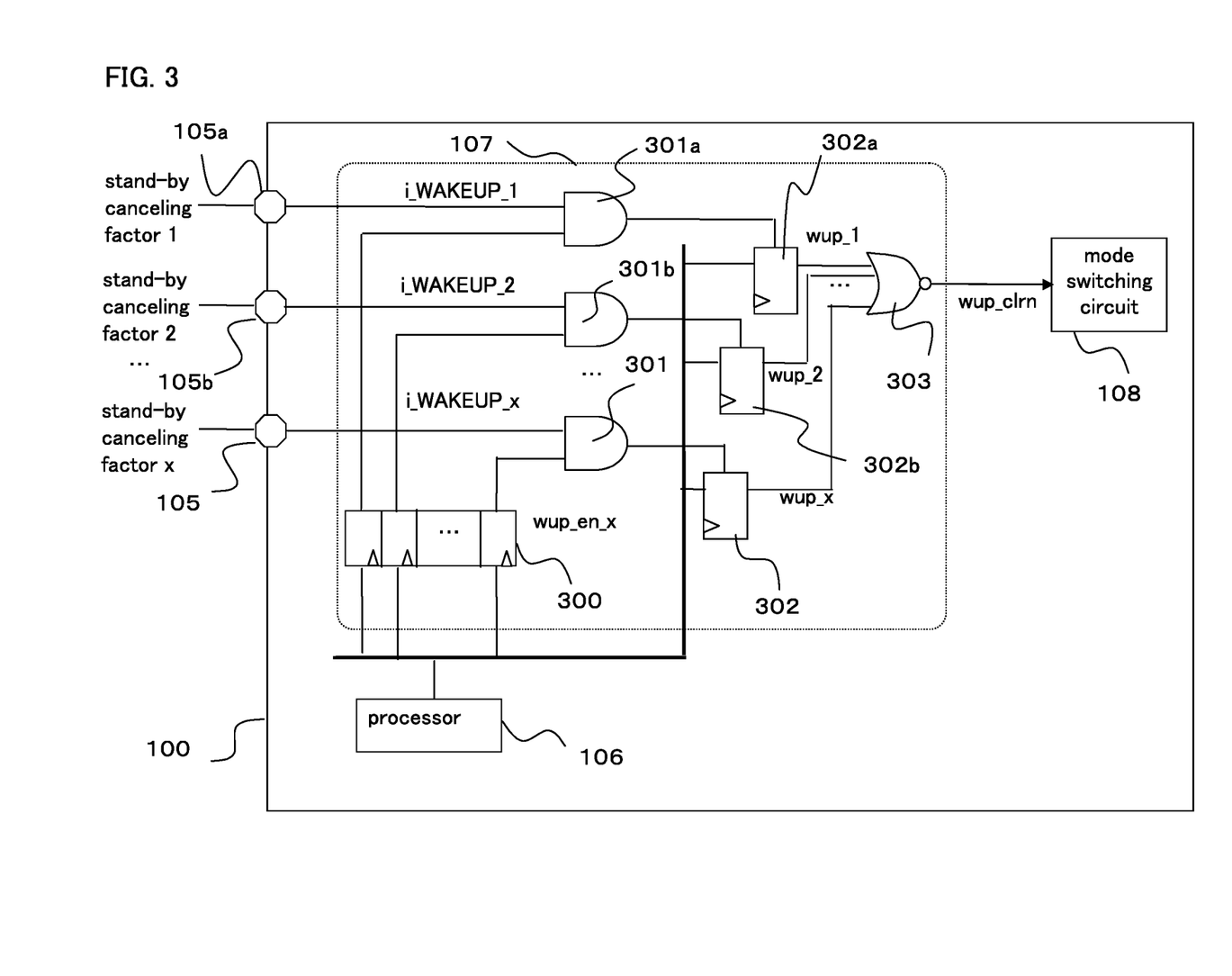
FIG. 3 is a diagram illustrating a stand-by canceling factor detecting circuit 107 in a semiconductor integrated circuit 100 according to Embodiment 1 of the present invention.

First, FIG. 3 illustrates an exemplary specific configuration of the stand-by canceling factor detecting circuit 107.

The stand-by canceling factor detecting circuit 107 includes a plurality of stand-by canceling factor selecting circuits (AND gate) 301a, 301b . . . 301. Inputs on one side of respective stand-by canceling factor selecting circuits (AND gate) are respectively connected to stand-by canceling factor input terminals 105a, 105b . . . 105. The stand-by canceling factor detecting circuit 107 also includes a stand-by canceling factor selecting register 300, and values, which are set in the FF circuits as respective storing regions of the register 300, are supplied to inputs on the other side of the stand-by canceling factor selecting circuits (AND gate) 301a, 301b . . . 301. The stand-by canceling factor detecting circuit 107 further includes: stand-by canceling factor selecting circuits (FF circuit with an asynchronous set) 302a, 302b . . . 302, which correspond to respective stand-by canceling factor selecting circuits 301a, 301b . . . 301; and a NOR circuit 303 which takes an output (wup_1, wup_2 . . . wup_x) of the FF circuits as an input. Each of the stand-by canceling factor selecting circuits (FF circuits with an asynchronous set) 302a, 302b . . . 302 is configured to be set asynchronous by a high level signal from the stand-by canceling factor selecting circuits (AND gate) 301a, 301b . . . 301, and the output of the FF circuits is outputted to the mode switching circuit 108 through the NOR circuit 303.

Figure 4:
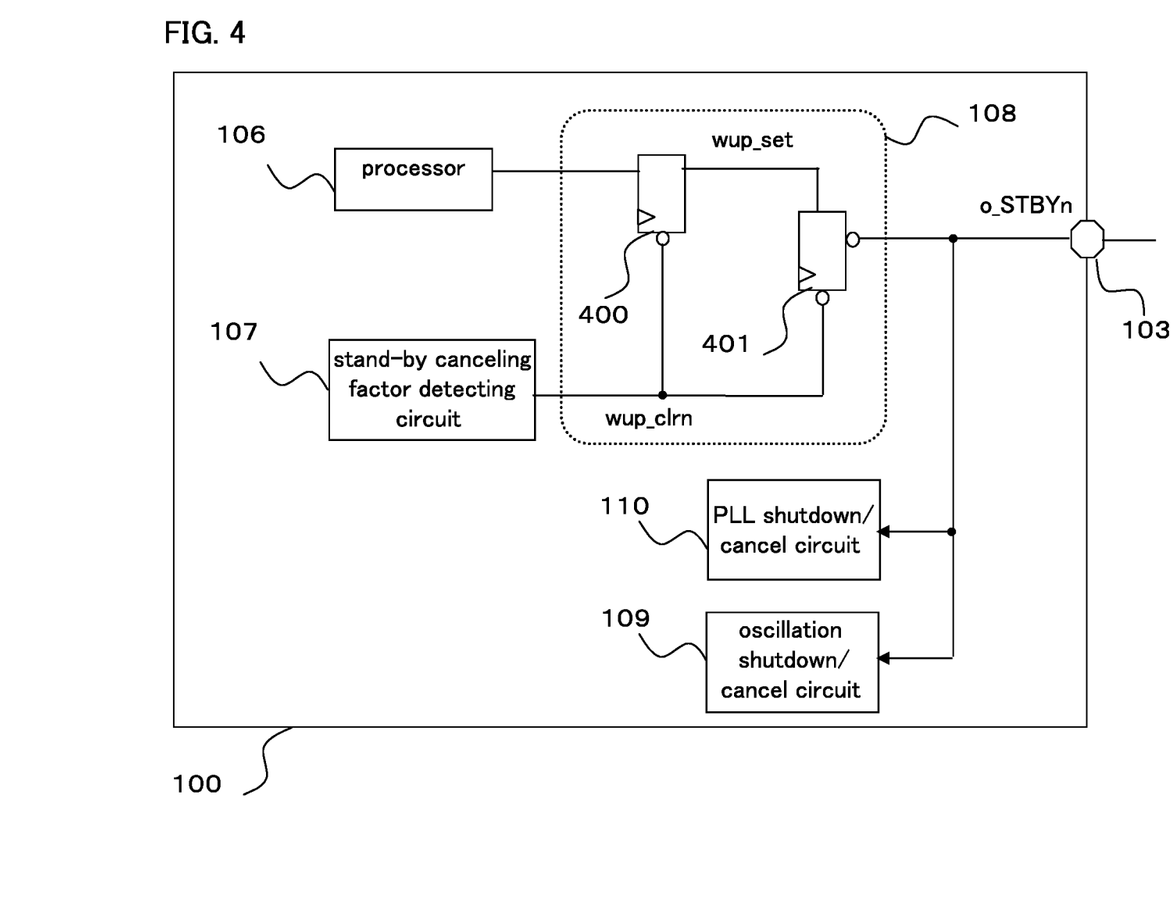
FIG. 4 is a diagram illustrating a mode switching circuit 108 in a semiconductor integrated circuit 100 according to Embodiment 1 of the present invention.

FIG. 4 illustrates an exemplary specific configuration of the mode switching circuit 108.

The mode switching circuit 108 includes: a stand-by mode switch-over register 400 to be reset as asynchronous when a stored value is set from "0" to "1" by the processor 106 and a wup_clrn signal outputted from the stand-by canceling factor detecting circuit 107 is changed from High to Low; and a stand-by mode switching signal controlling circuit 401 to be set as asynchronous on the basis of an output (wup_set) of the stand-by mode switch-over register 400 and for resetting to be asynchronous when the wup_clrn signal outputted from the stand-by canceling factor detecting circuit 107 is changed from High to Low.

Figure 5:
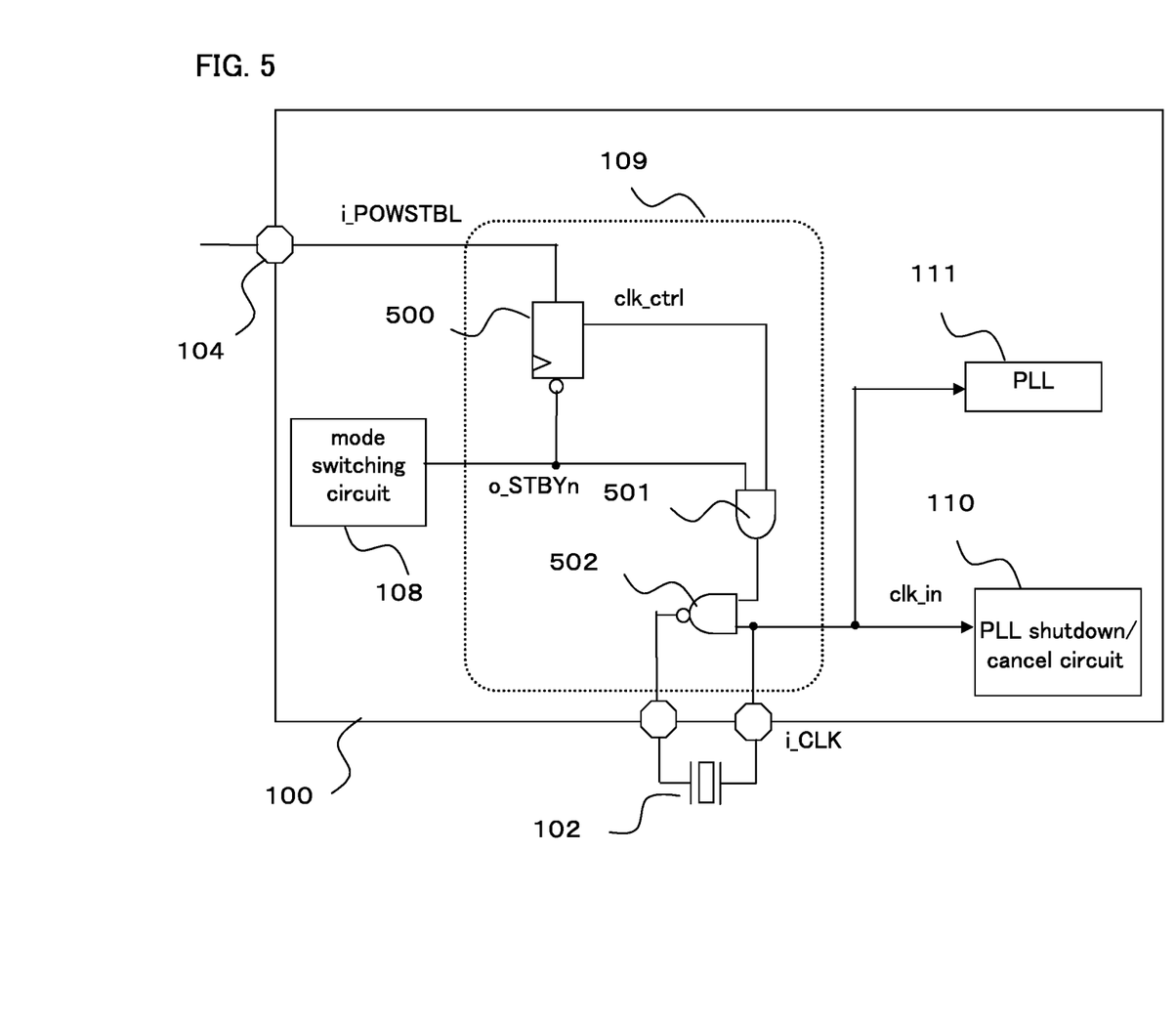
FIG. 5 is a diagram illustrating an oscillation shutdown/cancel circuit 109 in a semiconductor integrated circuit 100 according to Embodiment 1 of the present invention.

FIG. 5 illustrates an exemplary specific configuration of the oscillation shutdown/cancel circuit 109.

The oscillation shutdown/cancel circuit 109 includes: an oscillation shutdown signal generating circuit 500 to be set as "1" when a High pulse is inputted as an i_POWSTBL signal from the power supply circuit 101; an AND gate 501 for taking, as an input, an output signal (ctk_ctrl) of the circuit 500 and an output (o_STBYn) of the mode switching circuit 108; and a NAND gate 502 for taking, as an input, an output of the AND gate 501 and one terminal of the crystal oscillator 102. The other terminal of the crystal oscillator 102 is connected to the output of the NAND gate 502.

Figure 6:
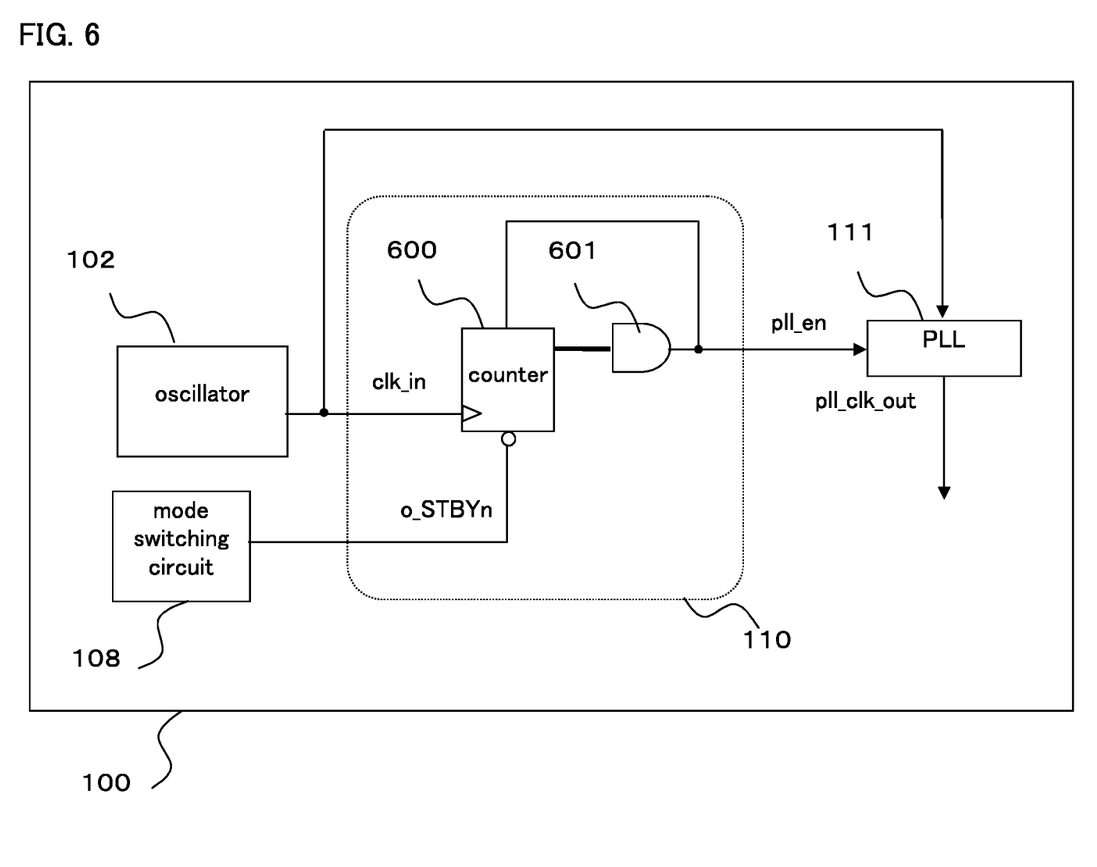
FIG. 6 is a diagram illustrating a PLL shutdown/cancel circuit 110 in a semiconductor integrated circuit 100 according to Embodiment 1 of the present invention.

FIG. 6 is a diagram illustrating an exemplary specific configuration of the PLL shutdown/cancel circuit 110.

The PLL shutdown/cancel circuit 110 includes: a counter 600 for performing a counting operation with an oscillation clock (i_CLK) from the crystal oscillator 102, and which is reset by a mode switching signal (o_STBYn) from the mode switching circuit 108; and an AND gate 601 for taking each bit of the counter 600 as an input and outputting a pll_en signal to the PLL circuit 111.

Figure 7:
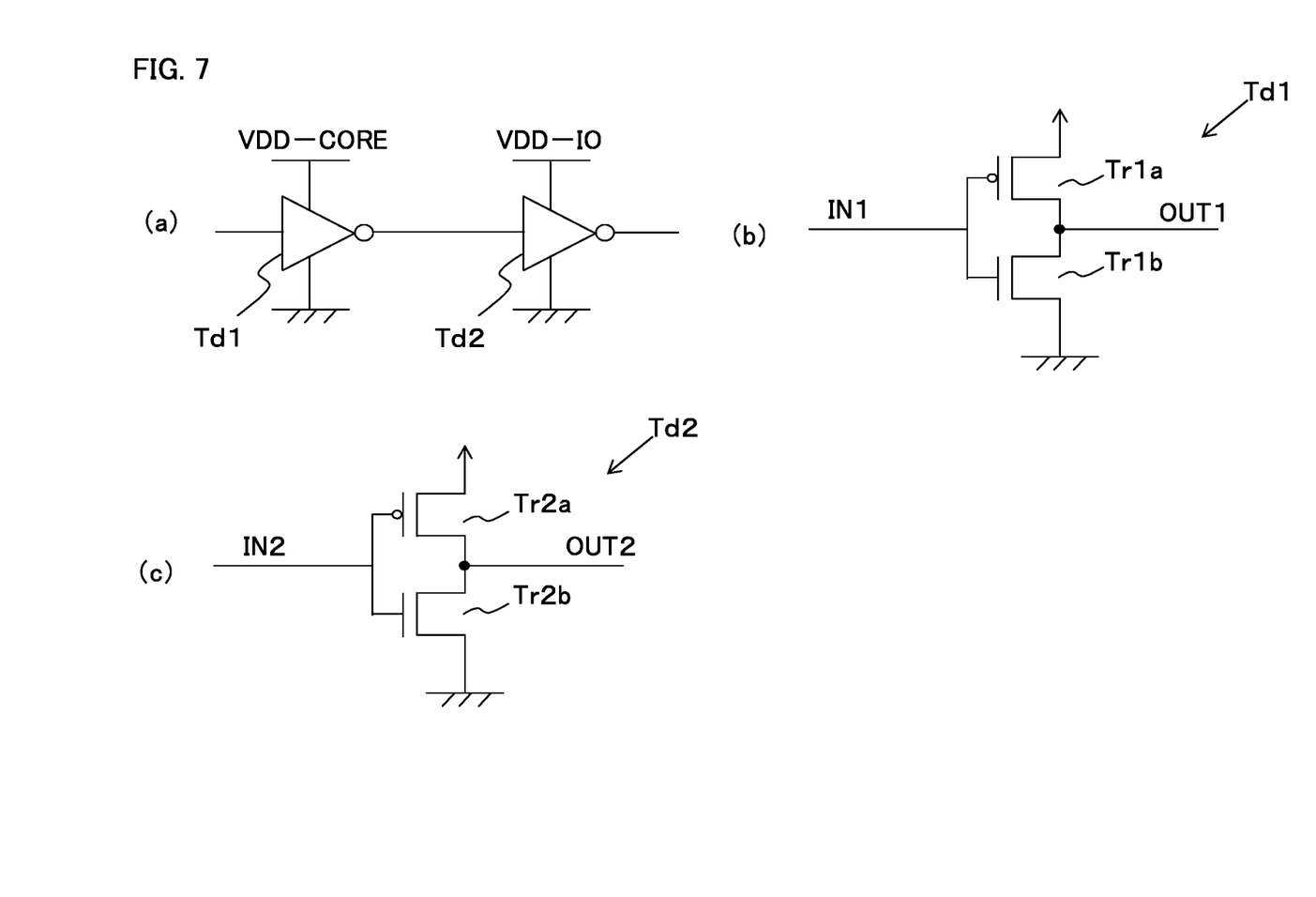
FIG. 7 is a diagram illustrating a mode-switching information outputting terminal 103 in a semiconductor integrated circuit 100 according to Embodiment 1 of the present invention.

FIG. 7 is a diagram illustrating the mode-switching information outputting terminal 103 in the semiconductor integrated circuit 100. FIG. 7(a) illustrates a circuit configuration thereof, and FIGS. 7(b) and 7(c) each illustrate a specific transistor circuit.

As illustrated in FIG. 7(a), the mode-switching information outputting terminal 103 includes: a first inverter circuit Td1 for reversing and outputting a mode switching signal (o_STBY) from the mode switching circuit 108; and a second inverter circuit Td2 for reversing and outputting an output of the first inverter circuit Td1. As illustrated in FIG. 7(b), the first inverter circuit Td1 includes a P-type MOS transistor Tr1a and an N-type MOS transistor Tr1b, connected between a core power source (VDD-CORE) and a ground. These transistors are set with a low threshold so that they can operate with a CORE voltage (0.8V±0.1V) in the stand-by mode. The high level of the output of the first inverter circuit Td1 is the level of the CORE voltage, and the low level of the output thereof is a grounding level. Further, as illustrated in FIG. 7(c), the second inverter circuit Td2 includes a P-type MOS transistor Tr2a and an N-type MOS transistor Tr2b, connected between an IO voltage (IO-VDD) and the ground. These transistors are set with a low threshold so that they can operate with a CORE voltage (0.8V±0.1V) in the stand-by mode. The high level of the output of the second inverter circuit Td2 is the level of an IO voltage (1.8V±0.1V), and the low level of the output thereof is a grounding level.

Next, an operation will be described hereinafter.

Figure 2:
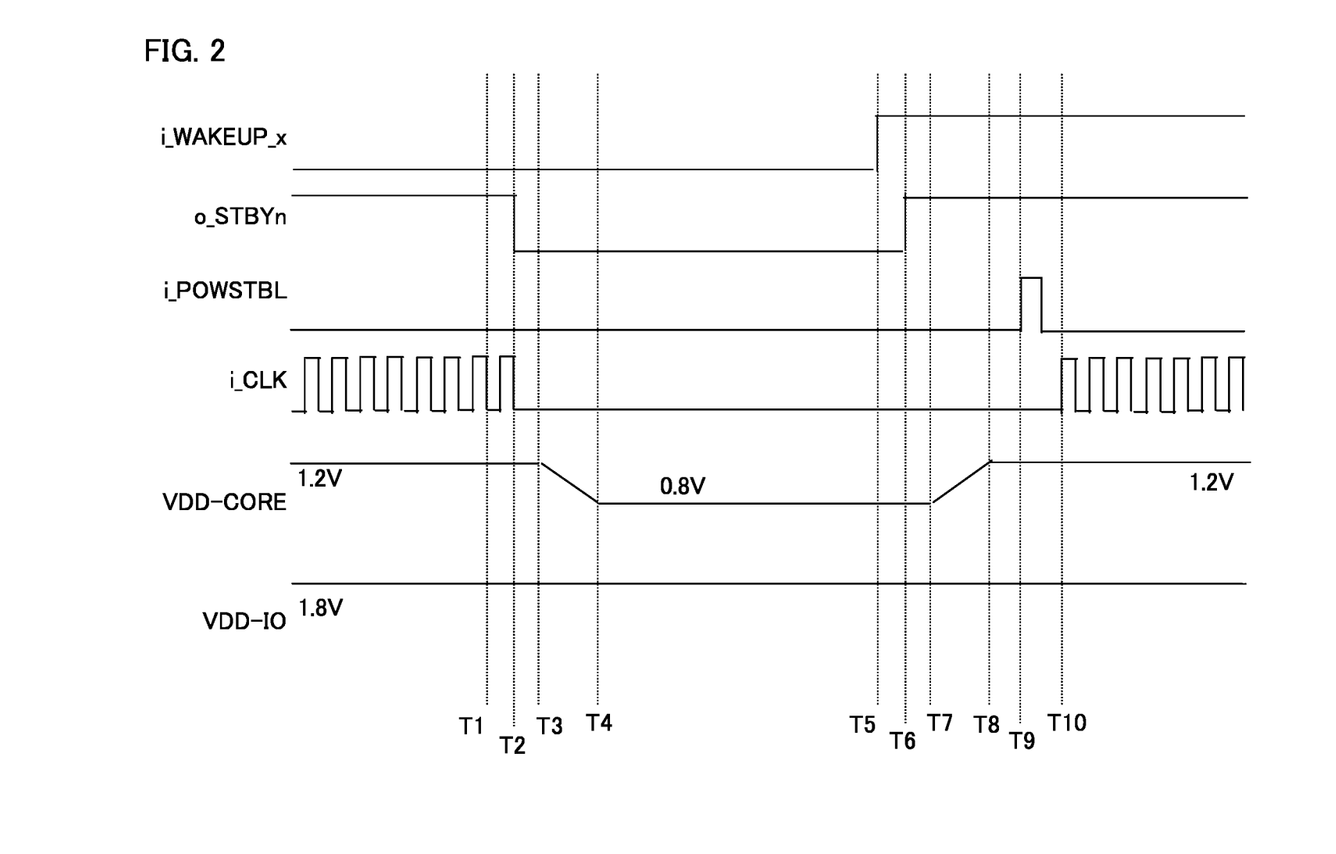
FIG. 2 is a diagram describing an operation of a semiconductor integrated circuit 100 according to Embodiment 1 of the present invention, illustrating a sequence of switching between a normal operation mode and a stand-by mode with a waveform.

FIG. 2 is a diagram illustrating a waveform representing a sequence when the semiconductor integrated circuit 100 illustrated in FIG. 1 switches over from a normal operation mode to a stand-by mode, and thereafter, restores from the stand-by mode to the normal operation mode.

Herein, it is supposed to be determined by the processor 106 that up to a time T1 (left side of T1), the semiconductor integrated circuit 100 operates in a normal operation mode, and at the time T1, the semiconductor integrated circuit 100 switches over to a stand-by mode. The switching over to the stand-by mode includes a case of an external factor where there is an input of a stand-by mode switching-over request signal from a predetermined terminal (not shown) of the semiconductor integrated circuit 100, as well as a case of an internal factor where the processor 106 detects no key input for a certain period of time to switch over to the stand-by mode.

When the processor 106 determines at the time T1 to switch over to the stand-by mode, the processor 106 sets several stand-by canceling factors to the stand-by canceling factor detecting circuit 107, as an external factor for canceling the stand-by mode. More particularly, the processor 106 sets "1" to a storing region (FF circuit) corresponding to a stand-by canceling factor to be effective, of the register 300 in the stand-by canceling factor detecting circuit 107. Thereafter, the processor 106 sends a signal to the mode switching circuit 108 to switch the mode of the semiconductor integrated circuit 100 over to the stand-by mode (time T2).

At the same time, the mode switching circuit 108 switches an internal controlling signal of the semiconductor integrated circuit 100 over to the stand-by mode. By this mode switching in the internal controlling signal, the PLL shutdown/cancel circuit 110 operates to shut down a PLL, using the internal controlling signal, and the oscillation shutdown/cancel circuit 109 operates to shut down the oscillation of the crystal oscillator 102, using the internal controlling signal. Further, the mode switching circuit 108 switches the internal controlling signal over to the stand-by mode, and simultaneously, changes the level of the o_STBYn signal from High to Low through the mode-switching information outputting terminal 103 in order to inform the power supply circuit 101 of the mode switching.

At the time T2, the power supply circuit 101 detects, by the High to Low change of the o_STBYn signal, that the semiconductor integrated circuit 100 has switched itself to the stand-by mode. During the times T3 to T4, the power supply circuit 101 drops the core voltage of the semiconductor integrated circuit 100 to a voltage (e.g., 0.8V±0.1V) which is far less than a normal operation use range (e.g., 1.2V±0.1V).

It is desirable that the voltage value to be dropped is a minimum voltage value to be retained as data in an SRAM or FF (flip flop) circuit in the semiconductor integrated circuit 100, and to be required for driving of the internal circuits for restoring from the stand-by mode to the normal operation mode, and for switching of signal levels at output terminals including a drive circuit. Note that the voltage drop can be observed only in the core voltage (VDD-CORE) and that a terminal voltage (VDD-IO), that is, a driving voltage of a drive circuit constituting an output terminal, is not changed.

Thereafter, when a pre-selected stand-by canceling factor occurs at the time T5, the semiconductor integrated circuit 100 transmits the factor as an internal signal through the stand-by canceling factor inputting terminal 105, and the stand-by canceling factor detecting circuit 107 detects the internal signal as the factor. When the mode controlled by the mode switching circuit 108 is switched to the normal operation mode by the detected signal, the o_STBYn signal appearing on the mode-switching information outputting terminal 103 is changed from Low to High (time T6).

The power supply circuit 101 detects that the o_STBYn signal is changed from Low to High, and during the times T7 to T8, the power supply circuit 101 boosts the core voltage (VDD-CORE) of the semiconductor integrated circuit 100 again to the voltage of the normal operation (e.g., 1.2V±0.1V). The power supply circuit 101 waits for the boosting to be completed, and then, at the time T9, the power supply circuit 101 outputs a High pulse as an i_POWSTBL signal.

The semiconductor integrated circuit 100 receives the High pulse of the i_POWSTBL signal through the power source stabilizing information inputting terminal 104, and the oscillation shutdown/cancel circuit 109 cancels the oscillation shutdown so that the crystal oscillator 102 starts oscillating again (time T10).

Thereafter, having waited for a certain period of time for an oscillation stabilizing time, the PLL shutdown/cancel circuit 110 enables the PLL circuit 111 again and resumes the clock supply to the entire system so as to achieve the returning from the stand-by mode to the normal operation mode.

Hereinafter, specific operations of the stand-by canceling factor detecting circuit 107, mode switching circuit 108, oscillation shutdown/cancel circuit 109 and PLL shutdown/cancel circuit 110 will be described.

First, in the stand-by canceling factor detecting circuit 107 illustrated in FIG. 3, "1" is set by the processor 106 in a part of the FF circuits in the stand-by canceling factor selecting register 300, so that a stand-by canceling factor is selected at the time T2.

In the stand-by canceling factor detecting circuit 107, owing to the working of a stand-by canceling factor selecting circuit (AND gate) 301, only the factor selected owing to the setting of "1" in the stand-by canceling factor selecting register 300 is used as a returning factor from the stand-by mode. When a High level signal is inputted into a stand-by canceling factor input terminal 105 with regard to the factor selected as the stand-by canceling factor by the processor 106, a corresponding stand-by canceling factor selecting circuit (FF circuit with an asynchronous set) 302 is set to be asynchronous, and the wup_clrn signals bundled by a stand-by canceling factor generating circuit (NOR gate) 303 are changed from High to Low (time T5). It is possible to confirm which stand-by canceling factor permitted the semiconductor integrated circuit 100 to return to the normal operation mode by reading the state of the stand-by canceling factor selecting circuit 302 after the mode is returned form the stand-by mode to the normal operation mode and the processor 106 starts normal operations. After the confirmation, on the assumption that the mode will be again switched over to the stand-by mode, it is desirable to set "0" to all of the registers (FF circuit) of the stand-by canceling factor selecting register 300 and the stand-by canceling factor selecting circuit 302.

In the mode switching circuit 108 illustrated in FIG. 4, first, it is presumed that at the switching from the normal operation mode to the stand-by mode, the stand-by mode switch-over register (FF circuit) 400 in the mode switching circuit 108 is set from "0" to "1" by the processor 106 at the time T2. As a result, the wup_set signal is changed from Low to High, the FF circuit, which is the stand-by mode switching signal controlling circuit 401, is set to be asynchronous, and the stand-by mode switching signal controlling circuit 401 changes the o_STBYn signal from High to Low.

In the meantime, when the mode returns from the stand-by mode to the normal operation mode in the mode switching circuit 108, the wup_clrn signal outputted from the stand-by canceling factor detecting circuit 107 is changed from High to Low. Thus, both the stand-by mode switch-over register 400 and the stand-by mode switching signal controlling circuit 401 are reset to be asynchronous. Owing to this, the o_STBYn signal is changed from Low to High, as a result (time T6). The changed o_STBYn signal is transmitted, not only to the oscillation shutdown/cancel circuit 109 and the PLL shutdown/cancel circuit 110, but also to the outside the semiconductor integrated circuit 100 through the mode-switching information outputting terminal 103.

In the oscillation shutdown/cancel circuit 109 illustrated in FIG. 5, first, when the mode is switched from the normal operation mode over to the stand-by mode, the o_STBYn signal is changed from High to Low. Thus, the input on one side of the oscillation shutdown circuit (NAND gate) 502 is fixed to Low by the oscillation shutdown signal generating circuits 500 and 501. At the same time, the terminal on one side of the crystal oscillator 102 is fixed to High, so that the crystal oscillation is shut down, and thus the clock of the overall semiconductor integrated circuit 100 is also shut down (time T2). Upon the returning from the stand-by mode to the normal operation mode, the o_STBYn signal is changed from Low to High (time T6), and thereafter, the core voltage returns to the electric potential in the normal operation. Thereafter, through the power source stabilizing information inputting terminal 104, the High pulse is inputted as the i_POWSTBL signal (time T9). Thereby, the output signal (ctk_ctrl) of the oscillation shutdown signal generating circuit 500 is set to be "1", and as a result, the output of the oscillation shutdown signal generating circuit 501 also becomes "1". Since the oscillation shutdown circuit (NAND gate) 502 now becomes equal with an inverter circuit, input and output of which are connected to both ends of the crystal oscillator 102, the crystal oscillator 102 starts oscillating at a specific frequency (time T10). This oscillation signal is transmitted to the PLL shutdown/cancel circuit 110 and the PLL circuit 111 as a clk_in signal.

When the mode is switched from the normal operation mode over to the stand-by mode in the PLL shutdown/cancel circuit 110 illustrated in FIG. 6, the o_STBYn signal is changed from High to Low. Accordingly, the PLL cancel time measuring circuit (counter) 600 is reset, and all of the input signals of the PLL enable signal generating circuit (AND gate) 601 become "0". Thus, the output signal, pll_en, of the PLL enable signal generating circuit 601 (AND gate) also becomes "0". Since the pll_en signal is an operation enable signal of the PLL, the PLL circuit 111 shuts down its functions when switching over to the stand-by mode. In addition, as described in the operation of the oscillation shutdown/cancel circuit 109 illustrated in FIG. 5, the crystal oscillator 102 is shut down simultaneously and the clock input, clK_in, to the PLL circuit 111 is also shut down (time T2).

When the mode returns from the stand-by mode to the normal operation mode, it typically takes a time until the oscillation is stabilized at a specific frequency even after the crystal oscillator 102 starts oscillating again. Thus, the PLL shutdown/cancel circuit 110 has a circuit configuration where a counter is provided as a PLL cancel time measuring circuit 600, the counter counts up the clk_in signal from the crystal oscillator 102 as a clock, and the counting up is continued until all of the bits become "1".

Herein, the bit number of the counter is selected to be an appropriate bit number in accordance with the time until the oscillation of the crystal oscillator 102 becomes stable. When all of the bits become "1", the output signal pll_en of the PLL enable signal generating circuit 601 becomes "1". By setting the FF circuit itself, functioning as the PLL cancel time measuring circuit 600, to be asynchronous by the output signal pll_en, the counter is forcibly shut down with all the bits as "1". The pll_en signal is transmitted to the PLL circuit 111, and the PLL circuit 111 is enabled. From the PLL circuit 111, a predetermined multiplied clock is outputted, as a pll_clk_out signal, to the clock generator 112. Thereby, the semiconductor integrated circuit 100 resumes operations again as a normal operation mode.

Hereinafter, effects of Embodiment of the present invention will be described.

As described above, the semiconductor integrated circuit 100 needs to operate in a state where there is no system clock during the times T2 to T10 illustrated in FIG. 2, and in a state where the core voltage is set to be an electric potential that is lower than during the normal operation, during the times T3 to T8. However, as exemplified in FIGS. 3 to 6, it is also apparent from the exemplified circuits that a series of operations can be operated in a clockless manner, the series of operations being: inputting stand-by canceling factors through the stand-by canceling factor input terminal 105; selecting only a pre-selected factor in the stand-by canceling factor detecting circuit 107; changing the mode retained at the mode switching circuit 108 to a normal operation mode; outputting an o_STBYn signal through the mode-switching information outputting terminal 103; and transmitting the o_STBYn signal to the oscillation shutdown/cancel circuit 109 and the PLL shutdown/cancel circuit 110 to reset the FF circuit, which configures the oscillation shutdown signal generating circuit 500 or PLL cancel time measuring circuit 600, to be asynchronous.

In the circuit for performing the series of operations, a gate circuit, an input terminal and an output terminal, may be prepared as needs arise so that the circuit can be operated with a low voltage during a stand-by mode. It is however possible to do with a limitative measure only for a part of the circuits in the semiconductor integrated circuit 100. Moreover, the series of operations are not required to be performed at an operation speed as fast as an ordinary semiconductor integrated circuit 100 operates since signals are transmitted in a clockless manner. Thus, it is sufficient enough for respective gate circuits constituting a series of circuits to be able to operate logically under a low voltage (to output an appropriate output signal with respect to input combinations). Under many conditions, thus, no dedicated gate circuit is necessary in order to achieve the semiconductor integrated circuit 100 according to Embodiment 1.

More particularly, in the semiconductor integrated circuit 100 according to Embodiment 1, apart of the circuits (stand-by canceling factor detecting circuit 107, mode switching circuit 108 and mode-switching information outputting terminal 103, in the example of FIG. 1) are operated in a clockless manner while the core voltage is further lowered than a power source voltage range during a normal operation, so that the core voltage at a stand-by mode can be decreased, thereby significantly decreasing leakage current of the semiconductor integrated circuit 100.

Circuits other than the parts of them described above can operate with the core voltage in the normal operation mode. Thus, it is sufficient enough to confirm that only apart of the circuits of the semiconductor integrated circuit 100 operate with a low voltage. As a result, it is possible to minimize the trouble of designing and inspecting the semiconductor integrated circuit 100.

As such, according to Embodiment 1, the semiconductor integrated circuit 100 includes the mode switching circuit 108 for switching an operation mode of the main core circuit among a plurality of internal circuits between a normal operation mode and a stand-by mode; and the stand-by canceling factor detecting circuit 107 for instructing the mode switching circuit 108 to cancel the stand-by mode, and the mode switching circuit 108 and the stand-by canceling factor detecting circuit 107 are configured to operate in asynchronism with the system clock with a stand-by voltage in the stand-by mode. As a result, in the stand-by mode, even when the operating voltage of the core circuit is reduced to a stand-by voltage, which is less than an operational limit based on the system clock, the mode switching circuit and the stand-by canceling circuit are operable in the stand-by mode without depending on the system clock, and the operation mode can be returned from the stand-by mode to the normal operation mode. As a result, leakage current during the stand-by mode can be restrained and power consumption of the system can be reduced without excess external parts or without excess return time to a normal operation mode. That is to say, in the semiconductor integrated circuit 100 according to Embodiment 1 of the present invention, the power is not shut down during a sleep mode, so that the SRAM block and FF inside the semiconductor integrated circuit 100 continue to retain data during the sleep mode. As a result, no excess circuit or external parts are required to return the internal state from the sleep mode to the normal operation mode. Furthermore, a time for recovery is not required. As a result, cost reduction of a system including the semiconductor integrated circuit 100, and fast recovery of the system to a normal operation mode can be achieved.

Hereinafter, further effects of the semiconductor integrated circuit 100 will be described.

In Embodiment 1, the mode-switching information outputting terminal 103, for externally outputting a mode switching signal outputted from the mode switching circuit 108, is constituted of the inverters Td1 and Td2 including a transistor operable with a stand-by voltage and with a low threshold voltage, so that it is possible to inform an external power supply circuit or the like of the returning from the stand-by mode to the normal mode.

Further, in Embodiment 1, the power supply circuit 101 supplies a core voltage in accordance with an operation mode, as an operating voltage, to the core circuits 106 to 113 among the plurality of internal circuits in the semiconductor integrated circuit 100, and the power supply circuit 101 supplies an operating voltage of a constant electric potential, regardless of the operation mode, to internal circuits (such as a drive circuit which constitutes an IO terminal 100b), other than the core circuits, among the plurality of internal circuits, so that a normal operating voltage can be maintained in the internal circuits with little leakage current other than the core circuits even during the stand-by mode.

Further, in Embodiment 1, the power supply circuit 101 receives an instruction to cancel a stand-by mode from the mode switching circuit 108, and then the power supply circuit 101 outputs a voltage stabilization signal (i_POWSTBL) when the core voltage is boosted from a stand-by voltage to an operating voltage at a normal operation mode. Having received the voltage stabilization signal from the power supply circuit 101, the semiconductor integrated circuit 100 resumes to generate a system clock, so that the returning from the stand-by mode to the normal operation mode can be made stably without causing a malfunction.

Further, in Embodiment 1, the stand-by canceling factor detecting circuit 107 instructs the mode switching circuit 108 to cancel the stand-by mode in accordance with a predetermined stand-by canceling factor among a plurality of stand-by canceling factors, so that a predetermined stand-by canceling factor can be masked in accordance with the use or operation state of the semiconductor integrated circuit 100.

For example, the following operation is possible. When a mobile device such as a mobile phone is folded for the closed state by closing a lid thereof to switch over to a stand-by mode, the mode can be set to return from the stand-by mode to a normal mode when the lid is opened, and the mode will not be switched from the stand-by mode to the normal mode even if an operation button is pressed during which the lid is closed.

Further, in Embodiment 1, the mode switching circuit 108 switches the operation mode of the core circuit from a normal operation mode to a stand-by mode based on an instruction signal from the processor 106 for controlling the core circuit, so that the switching-over of the operation of the core circuit to the stand-by mode can be avoided while the core circuit is being in operation under the controlling by the processor. As a result, it becomes possible to avoid hang-up and malfunction of the semiconductor integrated circuit.

Further, the semiconductor integrated circuit 100 according to Embodiment 1 is applicable to a battery-driven mobile device, such as a cell phone device and a notebook computer. By equipping the semiconductor integrated circuit 100 in such a mobile device, a mobile device with a longer battery operation time can be achieved owing to the reduction in power consumption.

As described above, the present invention is exemplified by the use of its preferred Embodiment 1. However, the present invention should not be interpreted solely based on Embodiment 1 described above. It is understood that the scope of the present invention should be interpreted solely based on the claims. It is also understood that those skilled in the art can implement equivalent scope of technology, based on the description of the present invention and common knowledge from the description of the detailed preferred Embodiment 1 of the present invention. Furthermore, it is understood that any patent, any patent application and any references cited in the present specification should be incorporated by reference in the present specification in the same manner as the contents are specifically described therein.

INDUSTRIAL APPLICABILITY

In the field of a semiconductor integrated circuit and an electronic information device equipped with the semiconductor integrated circuit, the present invention is to provide a semiconductor integrated circuit capable of achieving operations with reduced power consumption with restrained leakage current by further reducing power source voltage during a stand-by mode than the prior art, while maintaining advantages of shortening a time required to return from the stand-by mode, and of requiring no extra cost. The present invention is thus useful in the field of a battery-driven mobile device, such as a cell phone device or a notebook computer.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A semiconductor integrated circuit comprising a plurality of internal circuits, and having a normal operation mode, in which a major core circuit among the plurality of internal circuits performs an operation based on a system clock, and a stand-by mode, in which an operating voltage of the core circuit is decreased to a stand-by voltage that is lower than the operating voltage in the normal operation mode, the semiconductor integrated circuit further comprising:

a mode switching circuit of the core circuit for switching an operation mode of the core circuit between the normal operation mode and the stand-by mode; and a stand-by canceling circuit of the core circuit for instructing the mode switching circuit to cancel the stand-by mode, wherein: the mode switching circuit and the stand-by canceling circuit are configured to operate in asynchronism with the system clock, and wherein a threshold voltage for operation of the mode switching circuit and a threshold voltage for operation of the stand-by canceling circuit are less than the stand-by voltage; and in the stand-by mode, the operating voltage of the core circuit is decreased to the stand-by voltage which is less than a minimum voltage for core circuit operation based on the system clock.

2. A semiconductor integrated circuit according to claim 1, further including a mode switching information output terminal section for outputting, to an external power supply circuit, a mode switching signal for instructing mode switching outputted from the mode switching circuit, the mode switching information output terminal section including a transistor operable with the stand-by voltage and with a low threshold voltage.

3. A semiconductor integrated circuit according to claim 2, wherein:
the mode switching information output terminal section is connected with the power supply circuit for supplying the operating voltage to the plurality of internal circuits; and
the power supply circuit supplies a core voltage in accordance with the operation mode, as the operating voltage, to the core circuit, and supplies an operating voltage of a constant electric potential, regardless of the operation mode, to the internal circuits other than the core circuit among the plurality of internal circuits.

4. A semiconductor integrated circuit according to claim 2, wherein the power supply circuit includes a terminal for inputting a voltage stabilizing signal, which is outputted when the core voltage is raised from the stand-by voltage to the operating voltage in the normal operation mode, after the power supply circuit receives an instruction to cancel the stand-by mode from the mode switching information output terminal section.

5. A semiconductor integrated circuit according to claim 4, further including an oscillation shutdown cancel circuit for controlling a oscillation shutdown and shutdown cancel of an oscillator for generating a clock signal to be a reference of the system clock, the oscillation shutdown cancel circuit controlling the oscillator such that oscillation by the oscillator is shut down based on the mode switching signal from the mode switching circuit, and controlling the oscillator such that the oscillation by the oscillator is resumed based on the voltage stabilizing signal from the power supply circuit.

6. A semiconductor integrated circuit according to claim 1, wherein:
the plurality of internal circuits include a memory circuit for storing various data as the core circuit; and
the stand-by voltage is a voltage which is more than a limit for retaining a storing state of the data in the memory circuit.

7. A semiconductor integrated circuit according to claim 1, wherein the stand-by canceling circuit instructs the mode switching circuit to cancel the stand-by mode in accordance with a predetermined stand-by canceling factor among a plurality of stand-by canceling factors.

8. A semiconductor integrated circuit according to claim 7, wherein:
the stand-by canceling circuit includes a selection register with a plurality of setting regions for setting a value to each of the plurality of stand-by canceling factors, in accordance with whether each of the plurality of stand-by canceling factors is determined to be valid or invalid; and
by the value set in the setting regions of the selection register, a predetermined stand-by canceling factor is masked among the plurality of stand-by canceling factors in order not to cancel the stand-by mode by the redetermined stand-by canceling factor.

9. A semiconductor integrated circuit according to claim 1, further including a processor for controlling the core circuit, wherein the mode switching circuit switches the operation mode of the core circuit, from the normal operation mode to the stand-by mode, based on an instruction signal from the processor.

10. An electronic information device comprising
a semiconductor integrated circuit comprising a plurality of internal circuits, and having a normal operation mode, in which a major core circuit among the plurality of internal circuits performs an operation based on a system clock, and a stand-by mode, in which an operating voltage of the core circuit is decreased to a stand-by voltage that is lower than the operating voltage in the normal operation mode, the semiconductor integrated circuit further comprising:
a mode switching circuit of the core circuit for switching an operation mode of the core circuit between the normal operation mode and the stand-by mode; and
a stand-by cancelling circuit of the core circuit for instructing the mode switching circuit to cancel the stand-by mode, wherein:
the mode switching circuit and the stand-by canceling circuit are configured to operate in asynchronism with the system clock, and wherein a threshold voltage for operation of the mode switching circuit and a threshold voltage for operation of the stand-by canceling circuit are less than the stand-by voltage; and
in the stand-by mode the operating voltage of the core circuit is decreased to the stand-by voltage which is less than a minimum voltage for core circuit operation based on the system clock.

\* \* \* \* \*